(12) United States Patent
Tolinski

(10) Patent No.: US 6,467,837 B1
(45) Date of Patent: Oct. 22, 2002

(54) VEHICLE SUNROOF SEAL ASSEMBLY

(75) Inventor: Roch Tolinski, Howell, MI (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/699,025

(22) Filed: Oct. 27, 2000

(51) Int. Cl.$^7$ .................................................. B60J 7/00
(52) U.S. Cl. .............. 296/216.07; 296/213; 296/216.08
(58) Field of Search ............... 296/213, 216.06–216.08, 296/222, 223

(56) References Cited

U.S. PATENT DOCUMENTS

| | | | | |
|---|---|---|---|---|
| 5,022,705 A | * | 6/1991 | Takahashi | 296/216.08 X |
| 5,332,282 A | * | 7/1994 | Maeda et al. | 296/213 |
| 5,669,657 A | | 9/1997 | Miyazawa | |

FOREIGN PATENT DOCUMENTS

| | | |
|---|---|---|
| DE | 3940304 | 1/1991 |
| DE | 4308214 A1 | 9/1994 |
| DE | 4330582 | 10/1994 |
| DE | 4308221 C2 | 12/1996 |
| EP | 0 642 941 B1 | 2/1998 |
| JP | 7290970 | 11/1995 |

OTHER PUBLICATIONS

German Search Report, dated Jun. 3, 2002.

* cited by examiner

*Primary Examiner*—Dennis H. Pedder
(74) *Attorney, Agent, or Firm*—Carlson, Gaskey & Olds

(57) ABSTRACT

Sunroof frame members are sealed together by using a two-shot molding process. A first frame member includes a seal molded along a portion of a first mount interface. The seal presents an exposed engagement surface that is pressed against an adjoining frame member to provide a sealed sunroof frame. The method of sealing sunroof frame members together includes the steps of molding the first frame member in a pre-formed mold, indexing the mold, molding the seal into the first frame member while in the mold, and securing a second frame member to the first frame member such that the seal is sandwiched between the first and second frame members.

4 Claims, 2 Drawing Sheets

VEHICLE SUNROOF SEAL ASSEMBLY

BACKGROUND OF THE INVENTION

This invention relates a unique method and apparatus for sealing sunroof frame members to each other with a seal molded into the frame members.

Sunroof frames are mounted within a vehicle roof opening to support a slidable and/or pivotable sunroof. The frames are typically fixed to the vehicle roof and must be securely held in place and sealed to prevent water from leaking into the passenger compartment.

Among the frame members are corner pieces which include water channels for draining water away from the interior of the vehicle. The corner pieces and water channels are typically sealed with a butyl sealant. Typically, this sealant is injected between the two pieces. The two pieces are then heated, bonding the two together.

One disadvantage with this method is that the butyl sealant is difficult to work with. Special equipment is required to inject the butyl between the frame members, which significantly increases cost. Further, the process is messy and time consuming. During assembly, excess butyl material is forced out from between the sunroof frame members. This butyl material gets on the assemblers and on the assembly fixtures. The excess butyl must be cleaned away, which creates disposal problems and generates a significant amount in wasted material.

Thus, it is desirable to have a method and apparatus for sealing sunroof frame members to each other that eliminates the need for sealant injections during assembly. The method and apparatus should also be clean, inexpensive, and decrease assembly time.

SUMMARY OF THE INVENTION

In a disclosed embodiment of this invention, a vehicle sunroof mount assembly includes a unique method and apparatus for sealing sunroof frame members to each other. The vehicle sunroof mount assembly includes a first frame member mounted to a vehicle structure along a first portion of a vehicle roof opening. The first frame member has a first mount interface. A second frame member is mounted to the vehicle structure along a second portion of the vehicle roof opening and has a second mount interface positioned in an overlapping relationship to the first mount interface. A seal is molded into a portion of one of the mount interfaces and presents an exposed engagement surface for engaging the other of the mount interfaces to seal the first frame member to the second frame member.

Preferably, the two frame members include a first plastic corner and a second aluminum extrusion. The two are placed together, with the gasket being molded onto the plastic corner. The two are then heated, bonding the two together.

The method of sealing sunroof frame members together includes the steps of molding the first frame member from a first material in a pre-formed mold, indexing the mold, molding the seal from a second material into the first frame member while in the mold, and securing a second frame member to the first frame member such that the seal is sandwiched between the first and second frame members.

The use of two-shot molding process to form a seal in a sunroof frame member eliminates the need secondary sealants and provides for a cleaner assembly. This facilitates assembly and reduces cost.

These and other features of the present invention can be best understood from the following specification and drawings, the following of which is a brief description.

DETAILED DESCRIPTION OF A PREFERRED EMBODIMENT

Figure 1:
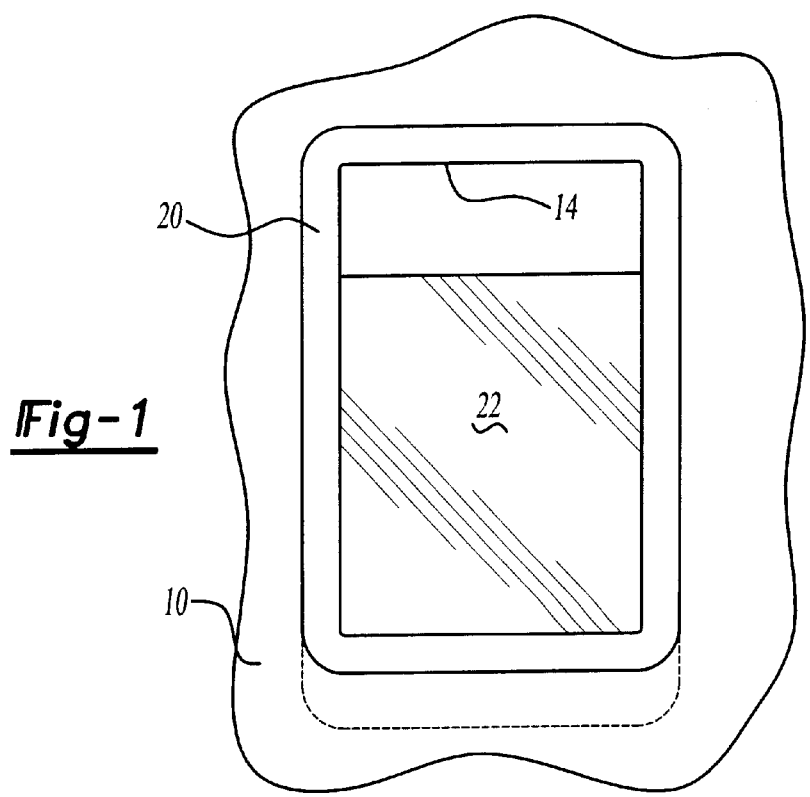
FIG. 1 is a schematic view of a vehicle having a sunroof.
Figure 2:
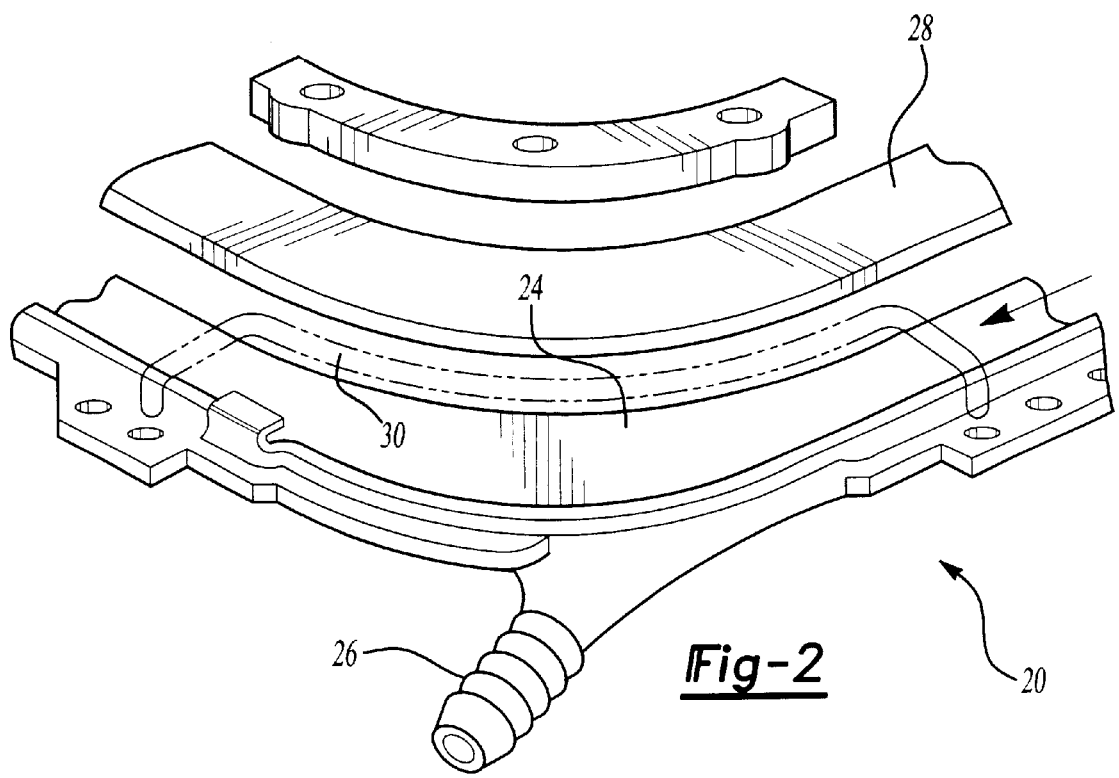
FIG. 2 is an exploded view of a sunroof and frame assembly incorporating the subject invention.

A vehicle roof is generally shown at 10 in FIG. 1. The roof 10 that includes a unroof opening 14 that is generally rectangular in shape with a sunroof frame 20, comprised of a plurality of frame members, is mounted within the opening 14 to support a sunroof 22. The subject invention relates to a method and apparatus for sealing frame members to each other. The subjection invention can be utilized with a sliding sunroof, a pivoting sunroof, or a sliding and pivoting sunroof. Further, the subject invention can be utilized with a manually operated sunroof or a power sunroof.

The frame 20 incorporates a plastic corner piece 24, having a tube 26 for draining water. An aluminum part 28 has typically been attached to the plastic corner. The frame has typically been sealed at 30 with the butyl, as described above.

Figure 3:
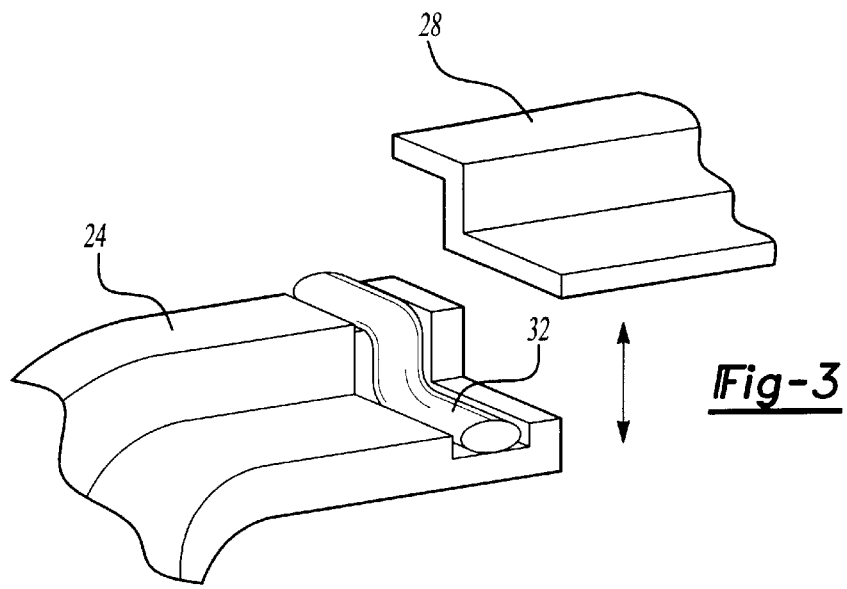
FIG. 3 is an exploded view, partially cut-away, of a portion adjoining sunroof frame members incorporation the subject invention.
Figure 4:
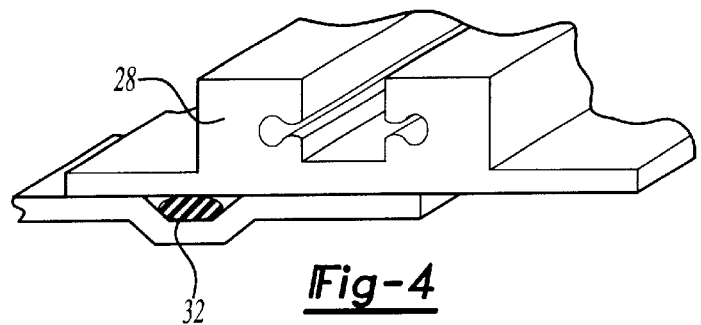
FIG. 4 is a partially cut-away view of a portion of a sunroof frame and seal assembly according to the subject invention.
Figure 5:
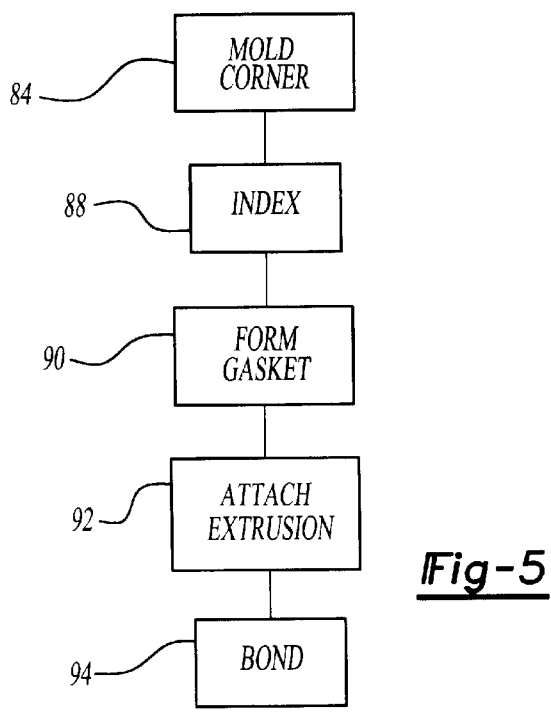
FIG. 5 is a flowchart describing a molding process used to form the seal.

The present invention improves upon this structure by modifying the corner piece 24 as shown in FIGS. 3 and 4. The corner piece 24, which can have several shapes and cross-sections, is provided with a molded gasket material 32, which roughly follows the path of the old butyl material 30. Thus, as shown in FIG. 3, the gasket material 32 will cross laterally across the plastic corner 24, and extend along a flat portion as shown in FIG. 4. The extrusion 28 is initially placed onto the plastic corner 24, and onto the gasket material 32. The two are then heated, bonding the two together.

A two-shot molding process is used to mold the seal or gasket 32 into at least one of the frame members. The process includes molding a sunroof frame member such as corner 24 which is formed from a first material in a pre-formed mold, indicated at 84. The frame member is preferably formed from a plastic material, however, other materials known in the art could also be used. The mold is indexed 88, and a second material is injected into the mold to form the seal 32 while the first frame member is still in the mold, 90. The second material is preferably a resilient rubber material, however, other known materials can be used. Thus, the frame member and the seal 32 are formed together as a single piece. During final assembly, a second frame member is secured to the first frame member 92 such that the seal 32 is sandwiched between the frame members. The two are then bonded 94.

The use of two-shot molding process to form a seal within the sunroof frame members themselves eliminates the need for secondary sealants, which results in a cleaner assembly process. This facilitates assembly and reduces cost.

Although a preferred embodiment of this invention has been disclosed, it should be understood that a worker of ordinary skill in the art would recognize many modifications come within the scope of this invention. For that reason, the following claims should be studied to determine the true scope and content of this invention.

What is claimed is:

1. A vehicle sunroof seal assembly comprising:

a first frame member comprising a plastic corner piece mounted to a vehicle structure along a first portion of a vehicle roof opening and having a first mount interface;

a second frame member comprising an aluminum extrusion mounted to the vehicle structure along a second portion of the vehicle roof opening and having a second mount interface positioned in an overlapping relationship to said first mount interface; and a seal molded into a portion of one of said mount interfaces and presenting an exposed engagement surface for engaging said other of said mount interfaces to seal said first frame member to said second frame member wherein said seal extends across a width of said first frame member, and then extends along a length of said first frame member.

2. A vehicle sunroof seal assembly comprising:

a first frame member having a first mount interface including a seal portion integrally molded with said first frame member as a single piece and presenting an exposed engagement surface wherein said seal portion extends across a width of said first frame member and along a predetermined length of said first frame member; and a second frame member having a second mount interface positioned in an overlapping relationship to said first mount interface, said second mount interface for engaging said exposed engagement surface of said first mount interface to seal said first frame member to said second frame member such that said first and second frame members are mountable to a vehicle structure along a portion of a vehicle roof opening with one of said first or second frame members being a plastic corner piece and the other of said first or second frame members being an aluminum extrusion and wherein said seal portion is heatable to form a bond that secures said first frame member to said second frame member.

3. An assembly as set forth in claim 2 including a drain tube extending radially outwardly from said plastic corner piece.

4. An assembly as set forth in claim 2 wherein said first frame member is comprised of a single piece structure.

* * * * *